United States Patent
Horiguchi et al.

(10) Patent No.: US 6,823,399 B2
(45) Date of Patent: Nov. 23, 2004

(54) APPARATUS CONTROL METHOD AND TRANSMISSION DEVICE

(75) Inventors: Mari Horiguchi, Kanagawa (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 09/729,482

(22) Filed: Dec. 4, 2000

(65) Prior Publication Data

US 2001/0028645 A1 Oct. 11, 2001

(30) Foreign Application Priority Data

Dec. 6, 1999 (JP) .......................................... P11-346802

(51) Int. Cl.⁷ .......................... G06F 3/00; G06F 11/00; G05B 23/02
(52) U.S. Cl. ................. 710/6; 340/3.3; 714/57
(58) Field of Search .............................. 710/6; 709/222, 709/223, 220; 340/3.3, 3.9, 825.25, 825.52, 3.1; 370/254

(56) References Cited

U.S. PATENT DOCUMENTS

| 5,402,115 A | * | 3/1995 | Tanaka ........................ 340/3.1 |
| 5,488,357 A | * | 1/1996 | Sato et al. ............. 340/825.25 |
| 5,689,244 A | * | 11/1997 | Iijima et al. .................. 340/3.9 |
| 5,828,656 A | * | 10/1998 | Sato et al. ................... 370/254 |
| 5,866,992 A | * | 2/1999 | Geiginger et al. ..... 340/825.52 |
| 5,922,050 A | * | 7/1999 | Madany ...................... 709/222 |
| 5,942,983 A | * | 8/1999 | Iijima et al. .................. 340/3.3 |
| 6,519,656 B2 | * | 2/2003 | Kondo et al. .................. 710/6 |
| 6,546,419 B1 | * | 4/2003 | Humpleman et al. ....... 709/223 |
| 6,785,720 B1 | * | 8/2004 | Seong ........................ 709/220 |

* cited by examiner

*Primary Examiner*—Glen A. Auve
*Assistant Examiner*—Christopher E. Lee
(74) *Attorney, Agent, or Firm*—Jay H. Maioli

(57) ABSTRACT

An apparatus controlling method for performing control between apparatuses connected to a predetermined bus line, in which in a data transmission between a first apparatus and a second apparatus, presetting of settings for inputting or outputting of data in the first apparatus is directed by a transmission of a command in a predetermined format via the bus line. Further, an identification data unique to the second apparatus is transmitted upon the transmission of the directing command, and the first apparatus stores the transmitted unique identification data when performing the presetting in accordance with the command.

10 Claims, 12 Drawing Sheets

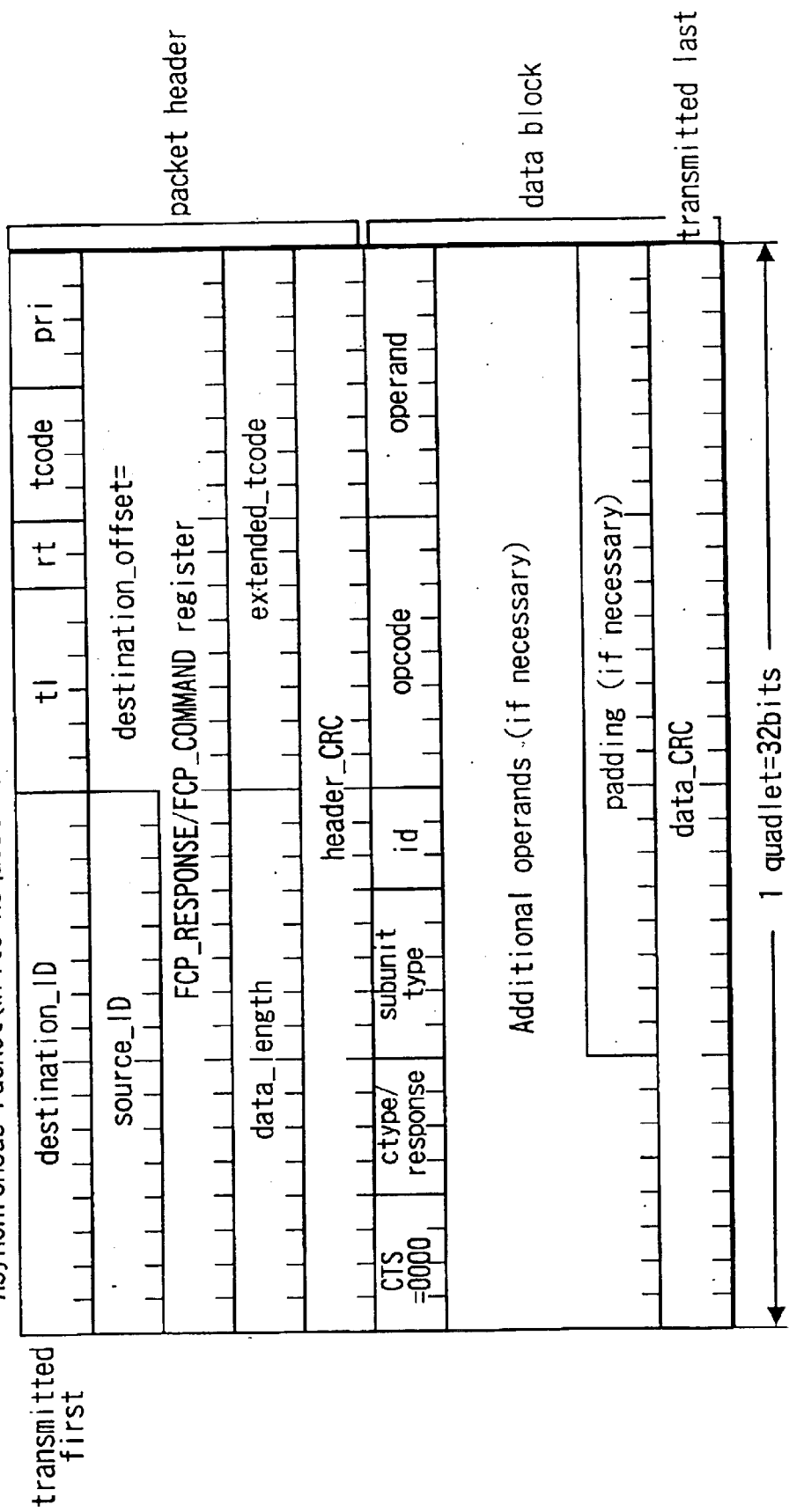

ctype/response

| | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future specification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

(B)

subunit_type

| | |
|---|---|
| 00000 ~ 00011 | Video monitor (reserved) Disc recorder/Player |
| 00100 | Tape recorder/Player |
| 00101 | Tuner |
| 00111 | Video Camera (reserved) |
| 11100 | Vendor unique |
| 11101 | reserved. |
| 11110 | Subunit type extended to next byte |
| 11111 | Unit* |

(C)

opecode:Operation Code

| | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

FIG. 5

|  | Command Format | Response Format |
|---|---|---|
| Opcode | REMOTE PRESET | <<< |
| Operand[0] | 0xFF | Preset tag |
| Operand[1] | 0xFF | Result status |
| Operand[2] | Source subunit | <<< |
| Operand[3] | Subunit source plug | <<< |
| Operand[4] | Unit output plug | <<< |
| Operand[5] | Input node ID | <<< |
| Operand[6] | | <<< |
| Operand[7] | Unit input plug | <<< |
| Operand[8] | Destination subunit | <<< |
| Operand[9] | Subunit destination plu | <<< |
| Operand[10] | Controller's GUID | <<< |
| Operand[11] | | <<< |
| Operand[12] | | <<< |
| Operand[13] | | <<< |
| Operand[14] | | <<< |
| Operand[15] | | <<< |
| Operand[16] | | <<< |
| Operand[17] | | <<< |
| Operand[18] | Controller's node id | <<< |
| Operand[19] | | <<< |

FIG. 6

|  | Command Format | Response Format |
|---|---|---|
| Opcode | REMOTE PRESET | <<< |
| Operand[0] | Preset tag | <<< |
| Operand[1] | 0xFF | Result status |
| Operand[2] | 0xFF | Source subunit |
| Operand[3] | 0xFF | Subunit source plug |
| Operand[4] | Unit output plug | <<< |
| Operand[5] | 0xFF | Input node ID |
| Operand[6] | 0xFF | |
| Operand[7] | 0xFF | Unit input plug |
| Operand[8] | 0xFF | Destination subunit |
| Operand[9] | 0xFF | Subunit destination plug |
| Operand[10] | 0xFF | Controller's GUID |
| Operand[11] | 0xFF | |
| Operand[12] | 0xFF | |
| Operand[13] | 0xFF | |
| Operand[14] | 0xFF | |
| Operand[15] | 0xFF | |
| Operand[16] | 0xFF | |
| Operand[17] | 0xFF | |
| Operand[18] | 0xFF | Controller's node id |
| Operand[19] | 0xFF | |

FIG. 11

|  | Command Format | Response Format |
|---|---|---|
| Opcode | OUTPUT PRESET(1C₁₆) | <<< |
| Operand[0] | 0/0x7F | self/entry number |
| Operand[1] | Destination node id | <<< |
| Operand[2] |  | <<< |
| Operand[3] | Destination subunit Subunit destination plug | <<< |
| Operand[4] |  | <<< |

FIG. 12

|  | Command Format | Response Format |
|---|---|---|
| Opcode | OUTPUT PRESET(1C₁₆) | <<< |
| Operand[0] | 0/entry number | self/entry number |
| Operand[1] | 0xFF | Destination node id |
| Operand[2] | 0xFF |  |
| Operand[3] | 0xFF | Destination subunit Subunit destination plug |
| Operand[4] | 0xFF |  |

FIG. 13

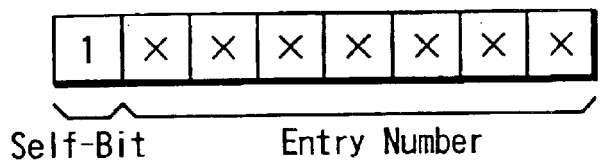

FIG. 14

|  | Command Format | Response Format |
|---|---|---|
| Opcode | OUTPUT PRESET(1C₁₆) | <<< |
| Operand[0] | 0/entry number | <<< |
| Operand[1] | 0xFF | <<< |
| Operand[2] | 0xFF | <<< |
| Operand[3] | 0xFF | <<< |
| Operand[4] | 0xFF | <<< |

APPARATUS CONTROL METHOD AND TRANSMISSION DEVICE

BACKGROUND OF THE INVENTION

1. Field of the Invention

The present invention relates to an apparatus controlling method and a transmission device suitably used for performing control between apparatuses interconnected via an IEEE1394 serial communication bus for example.

2. Description of the Related Art

An AV apparatus capable of mutually transmitting information via a network provided by an IEEE1394 serial communication bus has been developed. According to this network, by transmitting a predetermined command (selected from AV/C Command Transaction Set, hereinafter referred to as the AV/C commands), it is possible to control the AV apparatus connected to the network. Details of the AV/C command are written in AV/C digital Interface Command Set General Specification which is made public by 1394 Trade Association.

Now, in a configuration in which a plurality of AV apparatuses are interconnected, for example, if one television receiver and a plurality of video apparatuses (video decks) are interconnected, the television receiver, serving as an input apparatus to which video signal is inputted, has to select a video apparatus serving as a signal source. Here, according a prior art system for example, in which the interconnection is made by means of conventional video cable for transmission of an analog video signal, there is already a variety of apparatuses provided with a capability of an action (so-called the auto-play capability) in which signal receiving action in the input apparatus is automatically carried out by a control from the signal source apparatus. In addition, it is convenient for a user, if there can be an auto-recording action in which a video signal being received by the television receiver can be selected and recorded by the video apparatus.

According to the proposed AV/C commands, however, the above control of selecting the input apparatus and outputting apparatus is basically performed by a center controller located on the bus line. Therefore, the center controller has to have a heavy burden. Another problem is that without the command from the center controller, no selection of the input apparatus or the output apparatus can be made individually on any of the apparatuses on the bus line.

In order to solve the above described problems, the applicant of the present invention proposed a procedure (disclosed in the Japanese Patent Application No. 11-283452) in which a presetting such as settings that determines an input state can be made in other apparatuses located on the bus line by using the AV/C commands and so on.

Now, according to the IEEE1394 serial communication bus, if there is a change in a configuration of the apparatuses connected to the bus, i.e. when a new apparatus is connected to the bus, or an apparatus which has been connected to the bus is removed from the bus, a bus resetting is performed. In this bus resetting process, the controller on the bus controls each of the apparatuses connected to the bus to be given a new identification data. (This identification data is called the node ID.) again.

If the presetting above described has been made, and then the bus resetting is performed to change the node ID, the preset apparatus, which recognizes the opponent apparatus by the old node ID, can no longer identify the opponent apparatus. Thus, there is a problem that the preset state cannot be maintained.

Further, according to the auto-play action described above, the commanding apparatus is basically only one of the outputting apparatus and the inputting apparatus, and the selection of the commanding apparatus is made in advance. Therefore, it is difficult to perform an equal action by the commands from the opponent apparatus to the selected apparatus.

SUMMARY OF THE INVENTION

It is therefore a primary object of the present invention to make possible that a cooperative action such as the auto-play action is maintained between the apparatuses interconnected via a bus such as the IEEE1394 bus, even after the execution of the bus resetting operation and the like.

A second object of the present invention is to make possible that in a cooperative action such as the auto-play operation arranged between the apparatuses interconnected via a bus such as the IEEE1394 bus, commands for the action can be issued from the apparatus on whichever side.

A first aspect of the present invention provides an apparatus controlling method for data transmission between a first apparatus and a second apparatus connected to a predetermined bus line, wherein presetting of settings for inputting or outputting of data in the first apparatus is directed by a transmission of a command in a predetermined format via the bus line, wherein an identification data unique to the second apparatus being transmitted upon the transmission of the directing command, and wherein the first apparatus storing the transmitted unique identification data when performing the presetting in accordance with the command.

With the above arrangement, it becomes possible for the first apparatus in which the presetting is made to identify the second apparatus on the bus line at any time based on the unique identification data stored.

A second aspect of the present invention provides an apparatus controlling method for performing control between apparatuses connected to a predetermined bus line, wherein settings of output status in a first apparatus can be preset by a transmission of a predetermined command from a second apparatus so that data outputted from the first apparatus is received by the second apparatus, and wherein the issuance of the command from the second apparatus being made by a direction from the first apparatus.

With the above arrangement, it becomes possible to perform the presetting in the first apparatus for data transmission between the first apparatus and the second apparatus by the direction from the first apparatus.

BRIEF DESCRIPTION OF THE DRAWINGS

FIG. 3 is a diagram showing an arrangement example of AV/C commands;

FIG. 4 is a diagram showing examples of command types and so on of the AV/C commands;

FIG. 5 is a diagram showing an example of a remote input preset control command according to the first embodiment of the present invention;

FIG. 6 is a diagram showing an example of a remote input preset status command according to the first embodiment of the present invention;

FIG. 11 is a diagram showing an example of an output preset control command according to a second embodiment of the present invention;

FIG. 12 is a diagram showing an example of an output preset status command according to the second embodiment of the present invention;

FIG. 13 is a diagram showing an example of placement of a self-bit according to the second embodiment of the present invention; and FIG. 14 is a diagram showing an example of an output preset status command (an example for cancellation) according to the second embodiment of the present invention.

DETAILED DESCRIPTION OF THE PREFERRED EMBODIMENTS

Hereinafter, a first embodiment of the present invention will be described with reference to FIG. 1 to FIG. 9.

Figure 1:
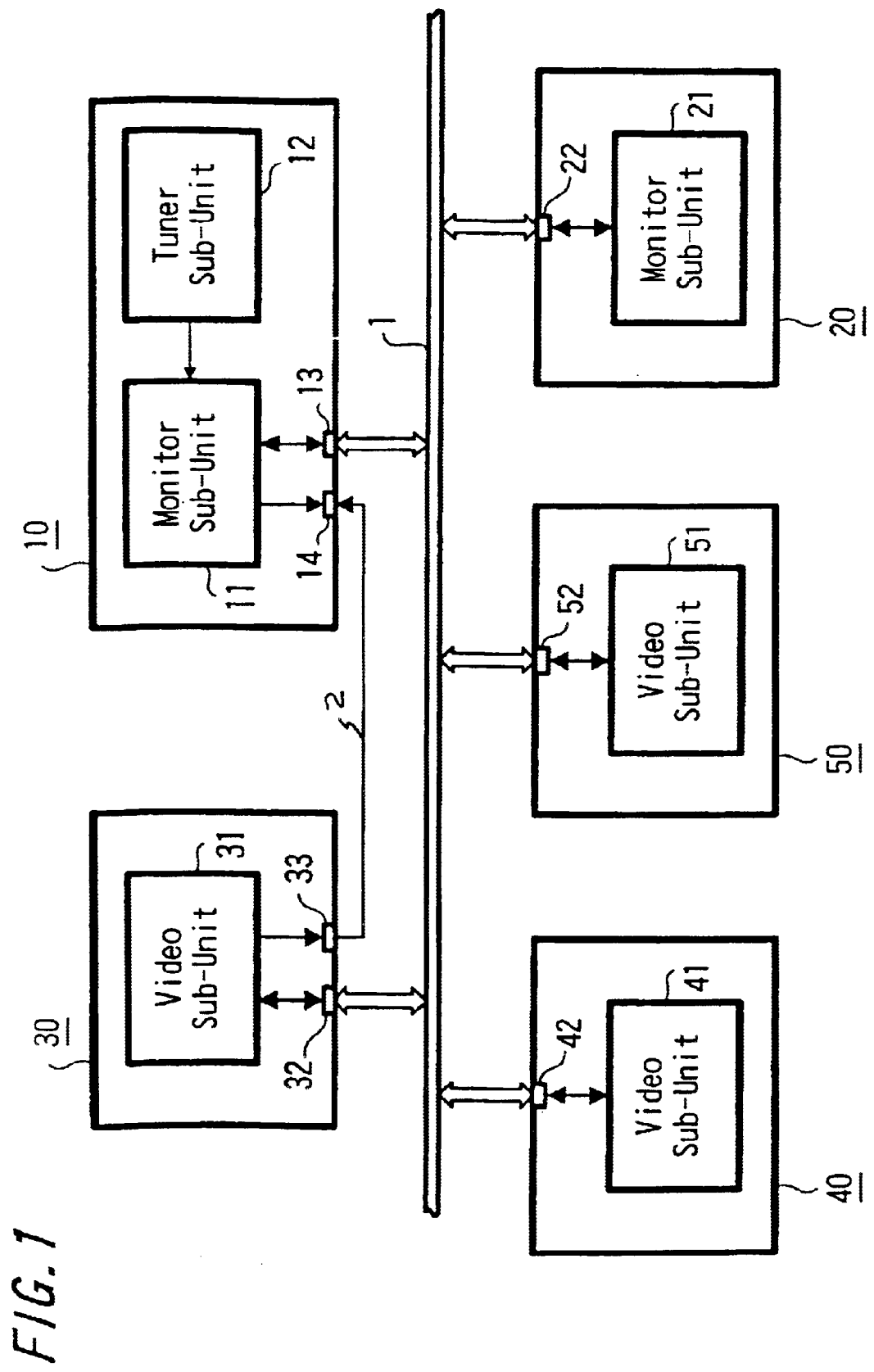
FIG. 1 is a block diagram showing a system configuration example according to a first embodiment of the present invention.

First, a configuration example of a network system to which the present invention is applied will be described with reference to FIG. 1. This network system uses a digital communication control bus, or more specifically, an IEEE1394 serial data bus line, (hereinafter simply called the bus), which interconnects a plurality of apparatuses. FIG. 1 shows an example in which five AV apparatuses 10, 20, 30, 40, 50 are interconnected via the bus 1. The example assumes that each of the apparatuses connected to the bus 1 is provided with a terminal for connection to the IEEE1394 bus, and in this particular example, a first and a second image receivers 10, 20 and a first, a second and a third video apparatuses 30, 40, 50 are networked together.

The first and the second image receivers 10, 20, respectively include monitor sub-units 11, 21, receive image data inputted from outside and display images in respective image display means. The first image receiver 10 further includes a tuner sub-unit 12 so that image data received by the tuner sub-unit 12 can also be processed.

Each of the first, the second and the third video apparatuses 30, 40, 50 respectively include video-sub-units 31, 41, 51, and is capable of recording the inputted image data by using a recording medium such as a video tape, and capable of outputting the recorded image data by replaying the medium.

It should be noted here that each of the apparatuses 10, 20, 30, 40, 50 connected to the bus 1 will be called a unit, and among the units, one unit can control another unit by mutually reading/writing information stored in each of the units with a descriptor specified in the AV/C Digital Interface Command Set General Specification of the AV/C Command Transaction Set (hereinafter called the AV/C). A function provided by the unit is called a sub-unit, and communication between the subunit in each of the apparatuses (units) and the bus 1 is made via plugs 13, 22, 32, 42, 52 provided in the apparatuses respectively. In this case, each of the plugs assumes a plurality of virtual output portions (output plugs) and virtual input portions (input plugs), so that communication can be made with the plurality of apparatuses simultaneously.

Each of the units connected to the bus 1 is also called a node, to which a specific node ID is assigned. Using this node ID, a source of data transmission and an intended unit as a receiver of the transmitted data can be identified. If there is an apparatus newly connected to the bus 1, or if disconnection of a currently connected apparatus is detected, the node ID is reset by a bus resetting operation, and new ID's are assigned. For this reason, when the bus is reset, the node ID of each apparatus may be changed.

It should also be noted here that each of the apparatuses (units) connected to the bus 1 includes a control block (not illustrated) which controls communication made via the bus 1. Settings of the plug above described and the like are also carried out under the control of the control block. Further, a preset-registration regarding input and output, to be described later, is also registered in this control block, so that a process registered in the preset-registration is carried out by the control block. The control block is connected with a memory for storage of data necessary for the control. When carrying out the preset-registration, an identification data called a GUID is stored in the memory. The data stored in this memory is maintained even if the bus resetting is executed.

The first video apparatus 30 in the present example is provided with an analog output portion 33, whereas the first image receiver 10 is provided with an analog input portion 14. The analog output portion 33 and the analog input portion 14 are connected together with an analog signal transmission line 2. Thus, if the signal picked from the recording medium in the first video apparatus 30 is an analog image signal, the transmission is made to the first image receiver 10 via the analog signal transmission line 2. All the data including image data transmitted via the bus 1 are digital data. With the above arrangement, in this example, the recording medium handled by the first video apparatus 10 can contain a mixture of record consisting of digital data and record consisting of analog data on a single piece of the medium. As a result, when such a piece of medium as the above is being replayed, there can be a case in which operation mode changes from replaying the digital data to replaying the analog data on the replay.

Figure 2:
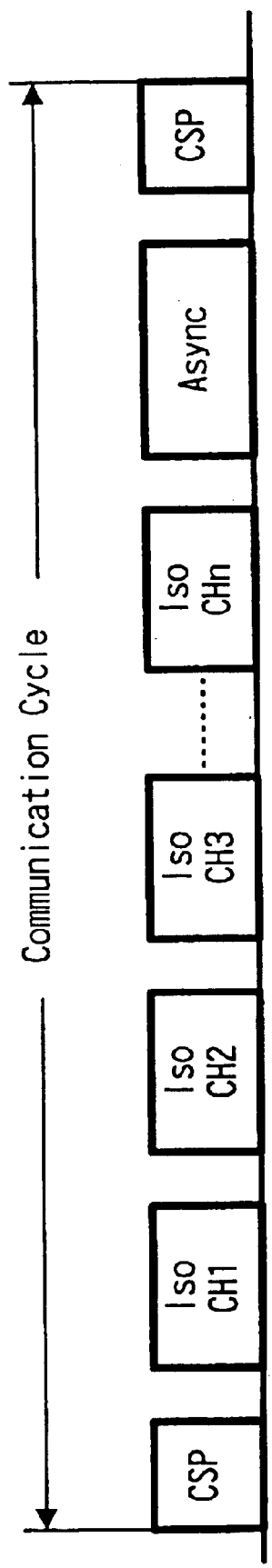
FIG. 2 is a diagram showing a state of transmission by means of an IEEE1394 bus method.

Next, description will be made for data transmission in the IEEE1394 bus 1 to which each of the apparatuses 10–50 is connected. The signal transmission at each of the apparatuses, as shown in FIG. 2, for example, is made by means of a time sharing multiplex method per predetermined communication cycle (125 μsec for example). The transmission of the signal is commenced when an apparatus called a cycle master (i.e. any one of the apparatuses on the bus 1) sends out onto the bus a cycle start packet which represents a starting point of the communication cycle. The cycle master is automatically selected in a procedure specified in the IEEE1394 when, for example, each of the apparatuses is connected to the bus cable.

There are two modes of the communication in a single communication cycle, i.e. an isochronous transmission (Iso transmission) for real-time data transmission of video data, audio data and so on, and asynchronous transmission (Async transmission) for more reliable transmission of control commands (the term "commands" used here includes commands and responses in the AV/C command system), still image data, text data and so on. In each of the transmission cycles, Iso packets for the isochronous transmission are transmitted before Async packets for asynchronous transmission. Each of the Iso packets within a single transmission cycle can include a plurality of Iso transmission data individualized by channel numbers 0, 1, 2, . . . 63. After the Iso packets are transmitted, the following period until the commencement of the next cycle start packet is used for the transmission of the Async packets. Therefore, the period usable for the transmission of the Async packets can vary depending on occupied bands being used for transmitting the Iso packets. The Iso packet transmission is a transmission mode in which reserved bands (the number of channels) are prioritized in each of the communication cycle, but the receiving side makes no confirmation. On the other hand, in the Async packet transmission, the receiving side confirms transmission status by sending acknowledgement (Ack) data for reliability in the data transmission.

Thus far, the data transmission among the apparatuses interconnected by the IEEE1394 serial bus has been outlined. Now, according to the system in the present example, each of the apparatuses can be controlled and a status of the apparatuses can be checked by using the AV/C commands which are the commands specified for controlling apparatuses interconnected via the IEEE1394 serial bus. Description will now cover data used in the AV/C command system.

FIG. 3 shows a data structure in the packet transmitted in the Async transmission mode of the AV/C command system. The AV/C commands are a set of commands for controlling AV apparatuses, with its CTS (ID of the command set)= "0000". An AV/C command frame and response frame are sent and received between the nodes. In order to reduce burden to the bus and the AV apparatuses, the response to the command is made within 100 ms basically. Data in the asynchronous packet comprises 32 bits in a horizontal direction (=1 quadlet). Upper rows in the figure show a header portion of the packet whereas lower rows in the figure show a data block. A "destination ID" indicates an address.

A field "ctype/response" indicates a function classification of the command if the packet is a command, and if the packet is a response, indicates a result of processing the command.

The commands are roughly classified into four kinds. Specifically, the following four kinds are defined: (1) command for controlling a function from outside (CONTROL); (2) command for inquiring a status from outside (STATUS); (3) command for inquiring presence of support to a control command from outside (GENERAL INQUIRY (presence or absence of opcode support) and SPECIFIC INQUIRY (presence or absence of opcode and operands support)); (4) command for requesting notification of status change to outside (NOTIFY).

The response takes different forms depending on the kind of the command received. Specifically, the responses to the CONTROL command include NOT IMPLEMENTED, ACCEPTED, REJECTED, and INTERIM. The responses to the STATUS command include NOT IMPLEMENTED, REJECTED, IN TRANSITION, and STABLE. The responses to the GENERAL INQUIRY command and the SPECIFIC INQUIRY command include IMPLEMENTED and NOT IMPLEMENTED. The response to the NOTIFY commands include NOT IMPLEMENTED, REJECTED, INTERIM and CHANGED. It should be noted here that other commands and responses than shown above can also be defined.

A "subunit type" field is provided for identifying a function within the apparatus. Examples of assignment to the field are "tape recorder/player", "tuner", and so on. In order to handle a situation in which there is a plurality of subunits of a same kind, an identification number is provided in a "subunit id" field for a purpose of addressing. An "opcode" field holds a command, and an "operand" field holds a parameter of the command. An "Additional operands" field is an extra field added as needed. A "padding" field is also an extra field added as needed. A "data CRC" (Cyclic Redundancy Check) field is used for error checking at the time of data transmission.

FIG. 4 shows specific examples of AV/C commands. A table (A) in FIG. 4 shows examples of "ctype/response". The table includes an upper box listing the commands, and a lower box listing the responses. CONTROL is assigned to "0000", STATUS is assigned to "0001", SPECIFIC INQUIRY is assigned to "0010", NOTIFY is assigned to "0011" and GENERAL INQUIRY is assigned to "0100". The numbers from "0101" through "0111" are reserved for future specifications. NOT IMPLEMENTED is assigned to "1000", ACCEPTED is assigned to "1001", REJECTED is assigned to "1010", IN TRANSITION is assigned to "1011", IMPLEMENTED/STABLE is assigned to "1100", CHANGED is assigned to "1101", and INTERIM is assigned to "1111". The number "1110" is reserved for a future specification.

Table (B) in FIG. 4 shows examples of "subunit type". "Video monitor" is assigned to "00000", "Disc reorder/Player" is assigned to "00011", "Tape recorder/Player" is assigned to "00100", "Tuner" is assigned to "00101", "Video camera" is assigned to "00111", "Vendor unique" is assigned to "11100", and "Subunit type extended to next byte" is assigned to "11110". A subunit type "Unit" assigned to "11111" is used when the command is directed to the commanding unit itself, e.g. when turning the power ON/OFF.

Table (C) in FIG. 4 shows examples of the "opcode". There is an opcode table for each of the "subunit type". The table (C) shows "opcode" examples for the "subunit type" being "Tape recorder/Player". Further, each of the "opcodes" has a set of operands defined. In this particular example, VENDOR-DEPENDENT is assigned to "00h", SEARCH MODE is assigned to "50h", TIMECODE is assigned to "51h", ATN is assigned to "52h", OPEN MIC is assigned to "60h", READ MIC is assigned to "61h", WRITE MIC is assigned to "62h", LOAD MEDIUM is assigned to "C1h", RECORD is assigned to "C2h", PLAY is assigned to "C3h", and WIND is assigned to "C4h".

By using the AV/C commands specified as the above, apparatuses, connected to the bus are controlled, and based on this control, data transmission is performed between the apparatuses interconnected via the bus. In the present example, description will cover a command by which an input apparatus capable of receiving stream data (destination apparatus) makes a data outputting apparatus (source apparatus) register to preset the input apparatus. When this command is transmitted, the output apparatus is so preset that when outputting the stream data, settings are configured for transmitting the stream data to the registered input apparatus. Hereinafter, such a command as the above will be called the preset control command.

FIG. 5 shows a data configuration example of the [opcode] and [operand] in the transmission of an AV/C command and a response thereto: The command is a remote preset control command, which is a command requesting to perform a registration of a preset regarding input and a response thereto. The data shown in this example are placed in the packet shown in FIG. 3. The command type in this case is [CONTROL] which indicates that this command is a control command. In an [opcode] area, data [REMOTE PRESET] which is a command requesting for the corresponding registration is entered.

An [operand (0)] area, which represents a field for receiving a preset tag in the response, is filled with a constant value when the command is transmitted. An [operand (1)] area, which represents a field for receiving a result status in the response, is filled with a constant value [0xFF] when the command is transmitted.

Areas [operand (2), (3)] are filled with data of the subunit and the subunit plug of the source apparatus. An area [operand (4)] is filled with data of the output plug through which the stream data is outputted from the source apparatus.

Areas [operand (5), (6)] are filled with node ID data of the destination apparatus. An area [operand (7)] is filled with data of the input plug of the destination apparatus. Areas [operand (8), (9)] are filled with data about the subunit type and the plug of the subunit of the destination apparatus.

Areas [operand (10)–(17)] are filled with data of the controller GUID (Global Unique ID). The GUID is an identification data unique to each of the apparatuses, i.e. every apparatus operated by the AV/C commands has its own unique identification data that is different from any others'. Specifically, the GUID comprises a manufacturer's code, serial number code per model and so on, to represent a unique value for each. Areas [operand (18), (19)] are filled with node ID of the controller. The term controller means an apparatus which issues this command. If the destination apparatus directly issues this command, then the GUID and the node ID of the destination apparatus are placed in the corresponding areas. On the other hand, if a different apparatus (a computer system for example) other than the destination apparatus issues this command, requests a registration of a destination apparatus, then the GUID and the node ID of that particular apparatus (the controller) is placed in the corresponding areas.

The response to the command comprises the following data: For each of the fields filled with an arrow symbol referring to the command format on the left-hand side, the data placed in the command is returned as the response. The area [operand (0)] is filled with the preset tag, which is a data regarding a preset number. The area [operand (1)] is filled with data regarding a result status, which is a data about the status of the apparatus.

FIG. 6 shows a data configuration example of the [opcode] and [operand] of another AV/C command in the transmission of a remote preset status command, which is a command to check a registration status of a preset and a response thereto. The data shown in this example are placed in the packet shown in FIG. 3. The command type in this case is [STATUS] which indicates that this command is a status command. In an [opcode] area, data [REMOTE PRESET], which is a command requesting a data regarding a setting status in the corresponding registration, is entered.

Data configuration in each of areas [operand (0)–(19)] is basically the same as in the control command shown in FIG. 5. However, since this command is only to check the preset status, the only fields to be filled with unique data is the field [operand (0)] which is filled with data of the preset tag number to be checked, and the field [operand (4)] which is filled with data of the unit's output plug. All the other fields are filled with the constant value [0xFF].

In the response to this command, if there is a preset registered in the inquired preset tag number, data regarding this particular preset are placed in areas of the command filled with specific values and then returned. Therefore, the GUID and the node ID of the apparatus which requested the presetting are also included in the response.

Next, an example of the presetting operation performed in the configuration of the present example will be described with reference to FIG. 7 and FIG. 8. An assumption is now made that there can be two cases; in one case, the video data outputted from the first video apparatus 30 onto the bus 1 is inputted to the first image receiver 10 for display, and in the other case, input is made to the second image receiver 20 for display. Therefore, there can be a case in which the first image receiver 10 makes a presetting request to the first video apparatus 30, and another case in which the second image receiver 20 makes a presetting request to the first video apparatus 30.

When the presetting request is made, a requesting apparatus (the first or the second image receiver 10, 20) is the controller, and the requested apparatus (the first video apparatus 30) is the target. FIG. 7 shows a case in which two presetting requests are conflicting with each other among the three apparatuses. According to the present embodiment, an arrangement is made so that the target can accept a presetting request from only one apparatus. More specifically, only the first presetting request is accepted in a so-called first-comer-preferred process, in which once a preset is established, another presetting request coming later from another apparatus is rejected.

Hereinafter, a specific processing example will be described following a chart in FIG. 7. At the beginning, the target apparatus, i.e. the first video apparatus 30, does not have a preset registered. When the first image receiver 10 transmits a preset control command to the first video apparatus 30 (step 101), the first video apparatus 30 accepts the preset registration directed by this control command, and responds by sending the [ACCEPTED] response (step 102). The data configuration in the present process corresponds to the command and response shown in FIG. 5 in the present process. In this process, the first video apparatus 30 stores each of the items directed in the command, including the node ID and the GUID of the first image receiver 10. Once this preset registration is established, when the first video apparatus 30 sends stream data such as video data into the bus 1 under a direction from the first image receiver 10, the first video apparatus 30 makes the transmission automatically to the first image receiver 10, making necessary arrangements such as changing settings in the output plug and linking connections on the bus.

Now, while this preset registration is enabled, the second image receiver 20 transmits another preset control command to the first video apparatus 30 (step 103). Then, the first video apparatus 30 rejects the request, does not to register the preset directed in this particular control command, and responds by sending the [REJECTED] response (step 104). Then, the second image receiver 20 sends a preset status command to the first video apparatus 30, inquiring the current preset status (step 105). The inquiry is responded with data regarding the current preset status. The data configuration shown in FIG. 6 corresponds to the configuration of a status command and response in the present process.

Upon receiving the response to the status command, the second image receiver 20 identifies, from the data included in the response, the node ID and the GUID of the apparatus which made the current preset registration, and then send a status command to the apparatus identified by the node ID, inquiring details such as a name of the apparatus (step 107), and receives a response (step 108). Upon receiving this response, the second image receiver 20 displays an error message on a screen, operation panel or the like, reporting that the preset request was rejected. At this time, the display includes the name of the registered apparatus (the first image receiver 10) currently preset in the first video apparatus 30 and other details based on the information obtained in the step 108. If the error message may not include the detailed information such as the name of the apparatus, the commands and responses in steps 107 and 108 are not necessary.

Continuing with the present example, when the first image receiver 10 sends to the first video apparatus 30 a preset control command which cancels the current preset (step 109), the first video apparatus 30 accepts the cancellation of the preset directed in the control command, and responds by sending the [ACCEPTED] response (step 110). In this process, the preset registration in the first video apparatus 30 is removed. When the preset registration is removed, the information such as the GUID of the registered apparatus stored in the first video apparatus 30 is erased.

In this state in which the preset registration is removed, it becomes possible to accept a preset registration request from one of the apparatus. For example, as shown in FIG. 7, when the second image receiver 20 transmits a preset control command to the first video apparatus 30 under this particular state (step 111), the first video apparatus 30 accepts the preset registration directed in this control command, responds by sending the [ACCEPTED] response (step 112), and carry out the preset registration as directed.

Figure 7:
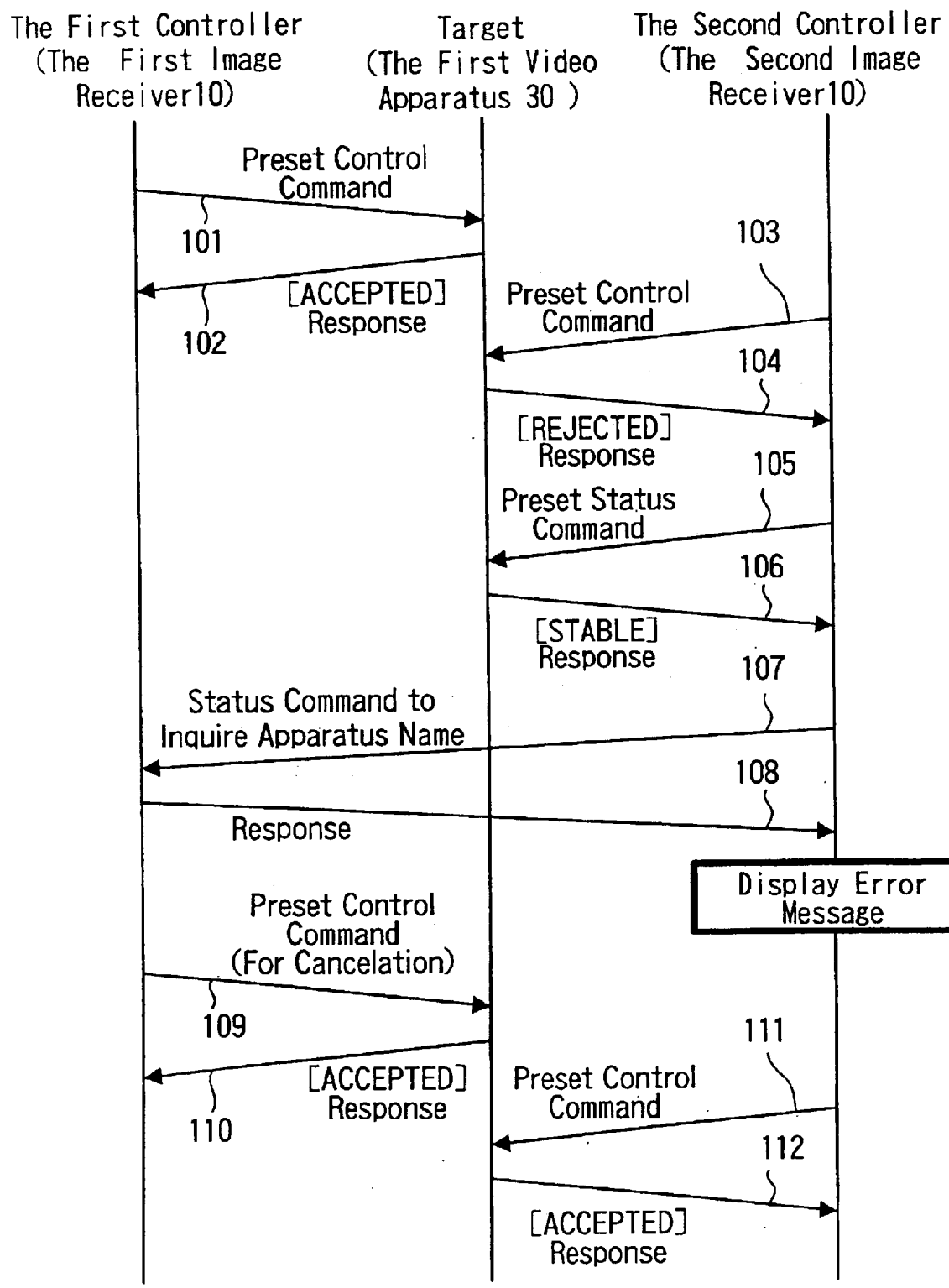
FIG. 7 is a time series diagram showing a processing example of a preset control command (an example in which presetting is executed in first-comer-preferred basis) according to the first embodiment of the present invention.
Figure 8:
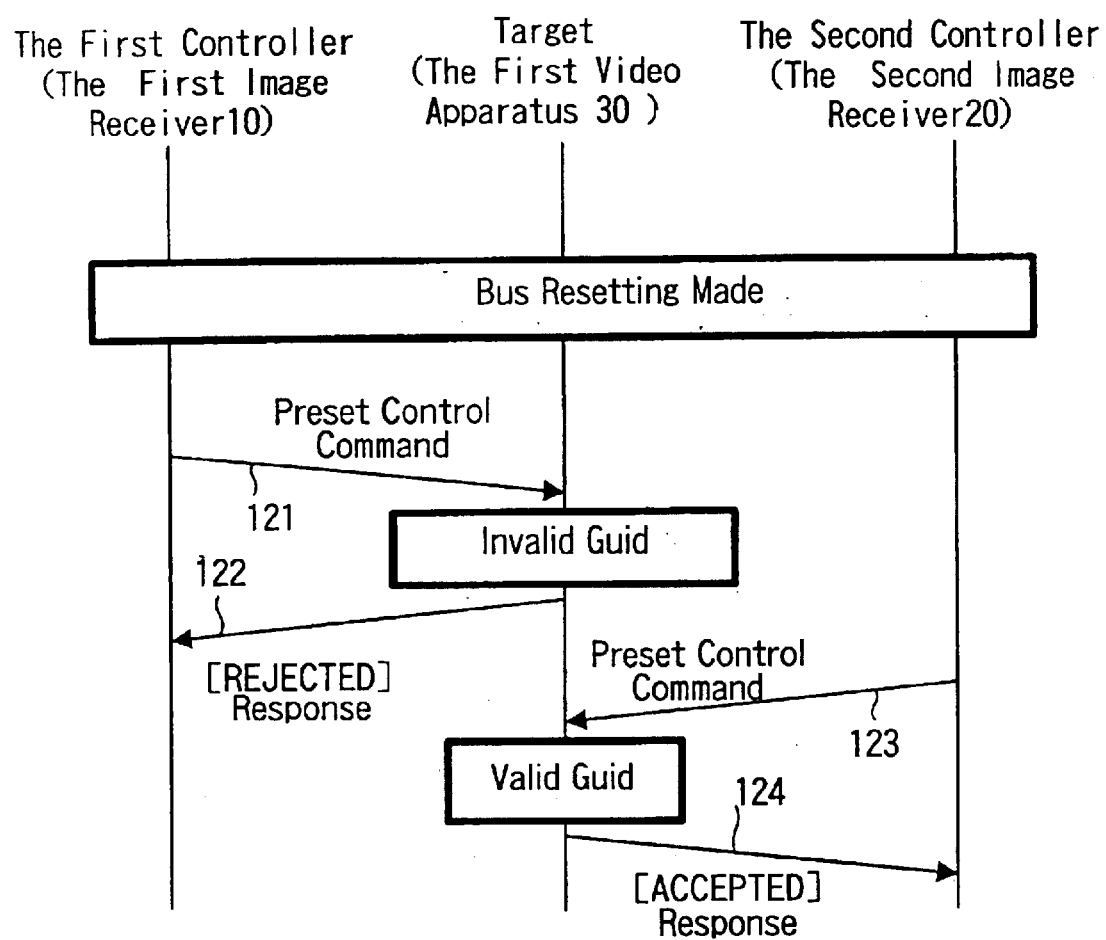
FIG. 8 a time series diagram showing a processing example at a time of a bus resetting according to the first embodiment of the present invention.
Figure 9:
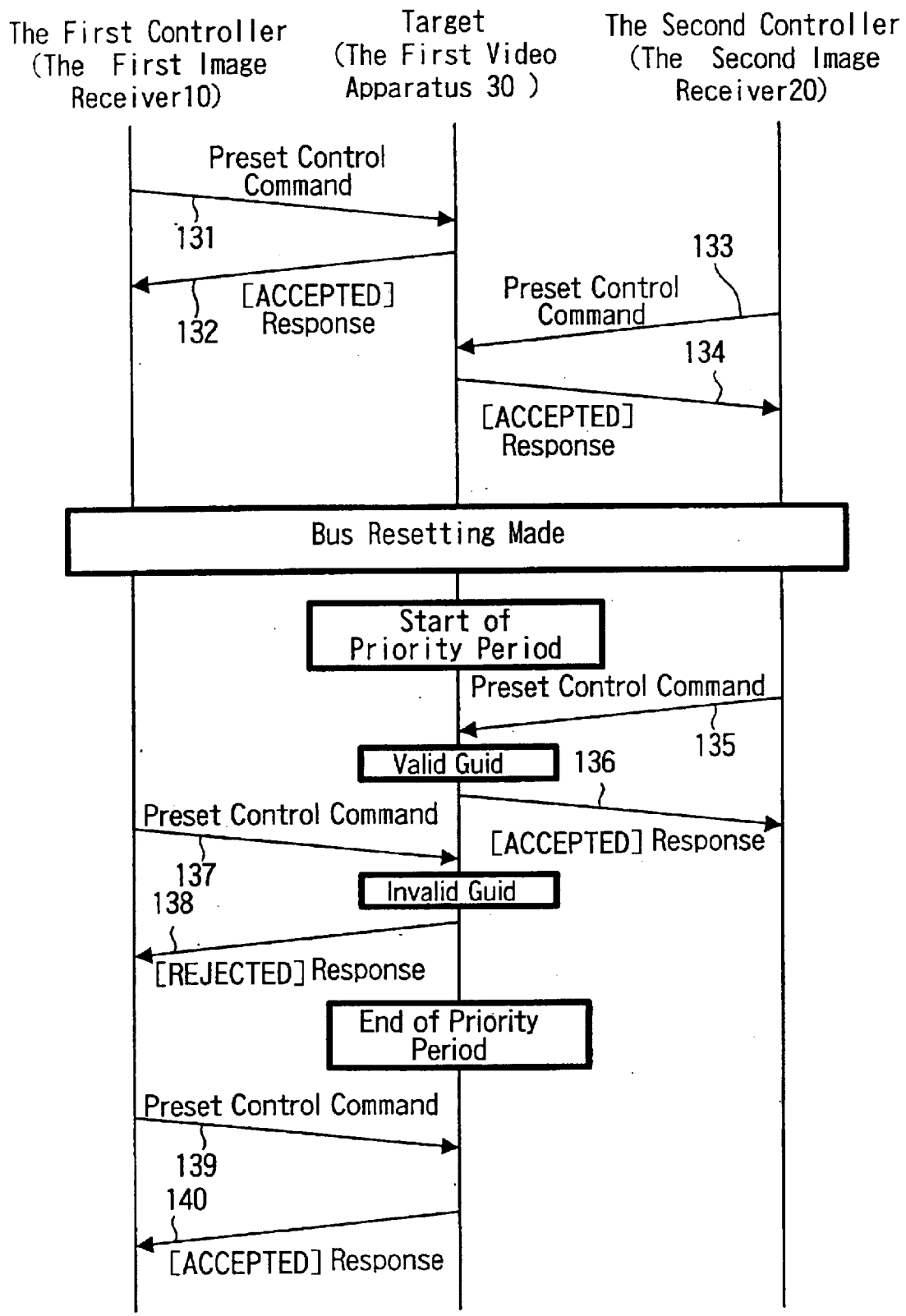
FIG. 9 is a time series diagram showing a processing example of a preset control command (an example in which presetting is executed in a last-comer-preferred basis) according to the first embodiment of the present invention.

Next, reference is made to FIG. 8, and description will cover an operation performed when the bus resetting is executed in the bus 1 to which each of the apparatuses is connected, during the time when a preset registration is enabled on the first-comer-preferred basis. A first state in an example shown in FIG. 8 is a state in which the operations up to the step 112 in FIG. 7 have been carried out, and the preset registration of the second image receiver 20 is enabled in the first video apparatus 30.

When the bus resetting is executed under the above described state, the apparatus in which the preset registration is enabled removes the preset registration, and waits for a next preset registration request. If the preset registration is not removed here, the operation registered in the preset might be performed for a different apparatus because the bus resetting will change the node ID's.

According to the present embodiment, even at such a time of the bus resetting, the GUID as the identification data to identificate the opposite apparatus which was preset just before the time of bus presetting continuously stored is stored continuously resetting, the GUID as the identification data to identificate the opposite apparatus which was preset at the time of bus presetting is continuously stored. And the target apparatus will accept only a preset control command from the apparatus having the GUID identical with the stored GUID. Specifically, as shown in FIG. 8, after the bus resetting has been made, according to the present embodiment, the apparatus that had requested the preset registration will request the said preset registration again. When the first image receiver 10 transmits a preset control command (step 121), the GUID transmitted within this particular command is compared to and found not identical with the GUID stored in the first video apparatus 30. Therefore the [REJECTED] response is send to the first video receiver 10 (step 122). When the second image receiver 20 transmits the said preset control command (step 123), the GUID transmitted within this particular command is compared to and found identical with the GUID stored in the first video apparatus 30. Therefore, the preset registration of the second image receiver 20 is accepted, the [ACCEPTED] response is sent to the second video receiver 20 (step 124), and the said preset registration is performed.

With the above arrangement, by performing the preset registration operation following the execution of the bus resetting, originally preset apparatus can be prioritized, and therefore the preset registration of the same apparatus can be maintained even if the bus resetting is made. It should be noted here that the arrangement may be so made that the comparing operation of the GUID's is performed only for a limited period of time following the bus resetting, and if there is no registration request during this time period from the apparatus which was registered in the preset at the time of the bus resetting, then any of the apparatuses are allowed to register after the time period has expired.

According to the examples shown in FIG. 7 and FIG. 8, the arrangement is so made that the preset registration can be made on the first-comer-preferred basis. Alternatively however, the preset registration may be made on a last-comer-preferred basis. A specific processing example of the preset registration on the last-comer-preferred basis will be described here with reference to FIG. 9. When the first image receiver 10 transmits a preset control command to the first video apparatus 30 (step 131), the first video apparatus 30 accepts the preset registration directed in this particular control command and sends the [ACCEPTED] response (step 132). Data configuration in the present process corresponds to the command and response shown in FIG. 5. In this process, the first video apparatus 30 stores each of the items directed in the command, including the node ID and the GUID of the first image receiver 10. Once this preset registration is established, when the first video apparatus 30 sends stream data such as video data into the bus 1 under a direction from the first image receiver 10, the first video apparatus 30 makes the transmission automatically to the first image receiver 10, making necessary arrangements such as changing settings in the output plug and linking connections on the bus.

Now, while this preset registration is enabled, the second image receiver 20 transmits a present control command to the first video apparatus 30 (step 133). Then, the first video apparatus 30 accepts the preset registration directed in this particular control command, and responds by sending the [ACCEPTED] response (step 134). Then, first video apparatus 30 changes the registered apparatus in its preset from the first image receiver 10 to the second image receiver 20. The GUID, the node ID and other information stored in the first video apparatus 30 are also changed to those of the second image receiver 20. In this way, according to the last-comer-preferred processing, each time when a preset control command is sent, the operation to change the preset to the apparatus directed in this particular command is performed.

When the bus resetting is executed in the above described state, the target apparatus, i.e. the first video apparatus 30 performs a priority processing during a predetermined time period that follows the bus resetting. The priority processing is performed only for a relatively short time period such as for two seconds after the bus resetting.

After the bus resetting has been made, each of the apparatuses which had issued a preset control command before re-issues the preset control command (since the controllers do not know what apparatus is preset currently in the target). However, during the priority processing period, the target holds the GUID of the apparatus which was registered in the preset at the time of the bus resetting, and accepts only the control command containing a GUID identical with the stored GUID. More specifically, according to the example in FIG. 9, when the second image receiver 20 transmits the preset control command (step 135), the two GUID's are found identical. Therefore the response accepting the command is transmitted (step 136), and the specified preset registration is made. On the other hand, when the preset control command comes from the first image receiver 10 (step 137) which is not the apparatus registered in the preset at the time of the bus resetting, since the two GUID's are not identical, the response rejecting the command is transmitted (step 138). With such an arrangement as the above, it becomes possible to maintain the same state as before the bus resetting, as far as the preset control command is transmitted during the priority period.

Once the priority period has been passed, the last-comer-preferred processing will accept a preset control command transmitted from the first image receiver 10 for example (step 139), then transmits the response accepting this particular commands (step 140), and then changes the apparatus registered in the first video apparatus 30 to the first image receiver 10. It should be noted here that again in this example, the preset registration can be cancelled if a control command for canceling the preset is transmitted.

Figure 10:
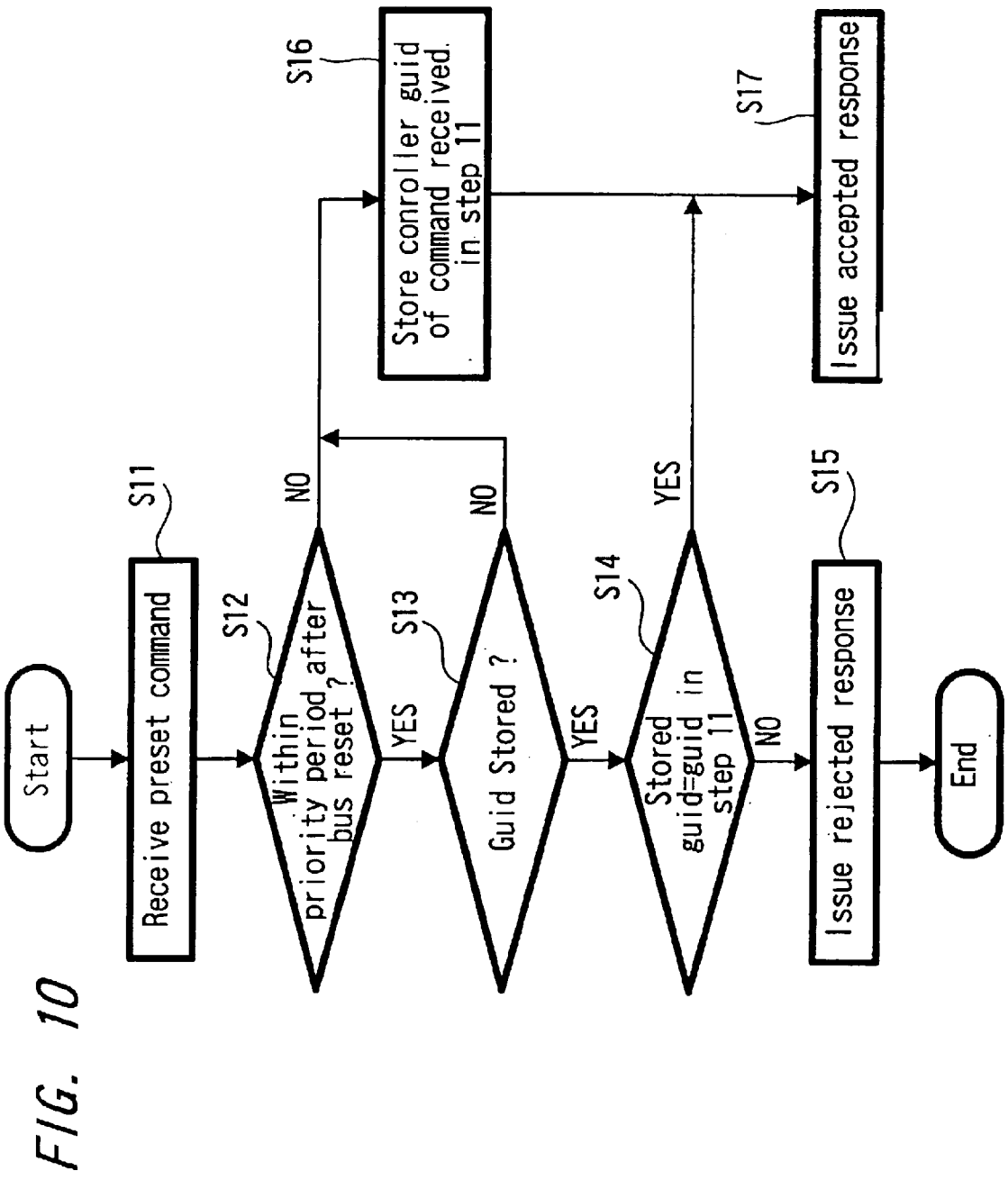
FIG. 10 is a flowchart showing an example of processing performed in a target apparatus when the presetting is executed in the last-comer-preferred basis.

The above preset registration processing performed in the target apparatus (i.e. the first video apparatus 30 in this example) in the last-comer-preferred processing will be described with reference to a flowchart in FIG. 10. When the target apparatus receives a preset command, (step S11), current status is checked if the priority period after the bus resetting is declared or not (step S12). If the priority period is declared, a check is made to see if there is a GUID regarding the registered apparatus stored in the memory of the target apparatus (step S13). If there is a registered GUID, this stored GUID is checked against a GUID contained in the command received in the step S11 (step S14). If the two GUID's are found identical with each other, the command is accepted, an [ACCEPTED] response is sent (step S17), and the required preset registration is made.

If the step S14 finds that the two GUID's are not identical with each other, the command is rejected and a [REJECTED] response is sent (step S15). Further, if the step S12 finds that the priority processing period is not declared, or if the step S13 finds that no GUID is stored in the memory, then the GUID contained in the command received in the step S11 is stored (step S16), and an [accepted] response is sent to notify that the command is accepted (step S17).

With such an arrangement as described above, it becomes possible also in the last-comer-preferred processing as in the first-comer-preferred processing, that the preset status immediately before the bus resetting is maintained right after the time of the bus resetting. It should be noted here that in this particular example, the input reset control command is configured as a command to establish output settings. Alternatively, an arrangement may be made in which the opponent apparatus sends a control command which establishes an input pre-setting.

Next, a second embodiment of the present invention will be described with reference to FIG. 11-FIG. 13. According to this embodiment, again, a plurality of apparatuses are interconnected via an IEEE1394 serial data bus. As for the interconnection, the configuration shown in FIG. 1 as in the first embodiment can be applicable, and as for transmission control, the command set specified in the AV/C commands is applied as in the first embodiment.

In the present embodiment, if a source apparatus transmits stream data such as video data to a destination apparatus via the bus 1, output status of the source apparatus can be preset by a control from the destination apparatus. FIG. 11 shows a data configuration example of the [opcode] and the [operand] of an AV/C command necessary for performing the preset registration in this case. The data shown in this example are placed in the packet shown in FIG. 3. The command type in this case is [CONTROL] which indicates that this command is a control command. In an [opcode] area, data [OUTPUT PRESET] which is a command requesting the corresponding registration is entered.

An [operand (0)] area, which represents a field for receiving a self-bit and an entry number in the response, is filled with a constant value [Ox7F] when the command is transmitted. This entry number is a number attached at each time of the preset registration as in the preset entry described with reference to FIG. 5. The self-bit is a one-bit data indicating whether or not the registration request is being made under the direction of the source apparatus. Areas [operand (1), (2)] are filled with the node ID of the destination apparatus. Areas [operand (3), (4)] are filled with data regarding the subunit type and the plug of the subunit of the destination apparatus.

In the response to this command, the area [operand (0)] is filled with the self-bit and a data regarding the entry number.

Further, a status command, which is a command to inquire a preset registration status, has a configuration shown in FIG. 12 for example. The command type in this case is [STATUS] which indicates that this command is a status command for an inquiry. In an [opcode] area, data [OUTPUT RESET], which is a command requesting a data regarding the corresponding registration, is entered.

The area [operand (0)] is a field to be filled in the response with the self-bit and the entry number. When the command is transmitted, the self-bit is set as "0", and the entry number is set as the data of the number to inquire. Areas [operand (1)] and thereafter are filled with a constant value [OxFF].

In the response to this command, a position of the area [operand (0)] reserved for the self-bit is filled with data about the setting of the self-bit, and a directed entry number is returned. Areas [operand (1), (2)] are filled with node ID data of the destination apparatus currently registered in the preset. Areas [operand (3), (4)] are filled with data regarding the subunit type and the subunit plug of the destination apparatus currently registered in the preset.

FIG. 13 shows an arrangement example of the self-bit and the entry number in the command and the response according to the present embodiment. The first single bit section of a block of eight bits for example, prepared as the [operand (0)] is used for the self-bit. The remaining seven-bit section is used for the entry number. The self-bit in this embodiment is given a data value "0" if the preset registration of the output has been performed under the direction of the destination apparatus. On the other hand, the self-bit is given a data value "1" when the preset registration of the output has been performed under the direction of the source apparatus.

Further, a control command for canceling the registered preset has a configuration shown in FIG. 14 for example. The command type is [CONTROL] which indicates that this command is a control command. In an [opcode] area, data [OUTPUT PRESET], which is a command for canceling the registered data, is entered.

The area [operand (0)] is a field to be filled in the response with the self-bit and the data about the entry number. When the command in transmitted, the self-bit is set as "0", and the entry number is set as the data of the number to cancel. Areas [operand (1)] and thereafter are filled with a specified constant value [OxFF].

In the response to this command, the data contained in the command is returned as originally arranged.

It should be noted here that according to each of the embodiments described above, data transmission is made within the network configuration of the IEEE1394 bus in the format of the AV/C commands. However, the present invention can also be applied to other network configurations, or to other formats. Further, according to each of the embodiments, the preset is made for transmitting video data, but a preset for transmitting other stream data on the bus may be made in the same procedures.

According to the present invention, it becomes possible among a plurality of apparatuses interconnected via a bus line, to make input selection, output selection and so on from one apparatus, cooperative with an opponent apparatus, making possible a satisfactory control among specific apparatuses within the network by means of a format such as the AV/C commands, without control from the center controller and so on.

In this case, according to the present invention, when the preset registration is performed by the command from the opponent, a unique identification data which clarifies the issuer of the command is transmitted. The preset apparatus stores this unique identification data, making possible to identify the apparatus which registered the preset, based on the unique identification data.

Therefore, when the preset registration becomes invalid due to a bus resetting operation performed in the bus line for example, and the node ID's of the apparatuses are changed, it is still possible to identify the issuer of the command from the stored identification data. Thus, it becomes possible to maintain the same state as before the bus resetting, by responding only to the preset command from the identified apparatus while not performing the presetting operation in response to any other preset commands sent from the other apparatuses than the identified one.

Further, even if there is incorporated an arrangement (so-called the last-comer-preferred arrangement) in which the preset apparatus is changed each time a command requesting a preset registration is transmitted, the stored identification data is maintained at least for a certain predetermined period following the bus resetting, and during this period the presetting is made only in response to the preset command from the apparatus identified by the stored identification data. After the predetermined period has been passed, this limitation is removed and a preset command from any of the apparatuses is accepted. During this predetermined period immediately following the bus resetting, the apparatus registered in the preset then re-issues the command. With this arrangement, it becomes possible to maintain the same preset status even after the bus resetting.

Further, an arrangement is made so that the preset is canceled if the apparatus that issued the preset command for this particular preset issues a command for canceling the preset while this particular preset is enabled. Therefore, cancellation of the preset has become easy.

Further, an arrangement is made so that a data for identification of the apparatus currently registered in the preset is transmitted to an issuer of a preset command which requests a presetting of settings for data transmission with one of the apparatuses other than the currently preset apparatus if the preset for the registered apparatus is enabled. With this arrangement, the issuer of the rejected command can identify which apparatus is registered in the currently enabled preset for which the command is rejected.

Further, according to the present invention, output status setting in the first apparatus can be preset by transmitting a predetermined command from the second apparatus so that the data outputted from the first apparatus is received by the second apparatus. In addition, the issuance of the command by the second apparatus can be made by a direction form the first apparatus. With this arrangement, it becomes possible to make settings for the transmission path between the two apparatuses by a direction from whichever apparatus.

In this case, when the second apparatus issues a command under the direction of the first apparatus, an identification data indicating that the command is issued under the direction from the first apparatus is attached to a predetermined section of the command. With this arrangement, it has become possible to easily confirm that the processing is performed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus controlling method for performing control between apparatuses connected to a predetermined bus line, wherein in an audio/video stream data transmission between a first apparatus and a second apparatus, presetting of settings for inputting or outputting the audio/video stream of data in the first apparatus is directed by a transmission of a command in a predetermined format via the bus line, wherein an identification data unique to the second apparatus is transmitted upon the transmission of the command, and the first apparatus stores the transmitted unique identification data when performing the presetting in accordance with the command; and when the audio/video stream data transmission between the first apparatus and the second apparatus is preset and a third apparatus sends another command to the first apparatus, the first apparatus rejects the other command, and the third apparatus sends a status command to the second apparatus requesting identification information relating to the second apparatus for reporting an error message.

2. The apparatus controlling method according to claim 1, wherein the first apparatus disables the preset, identifies the second apparatus connected to the bus line from the stored identification data, and then does not perform the presetting in response to a directing command transmitted from any other of the apparatuses than the identified second apparatus once a resetting is performed in the bus line.

3. The apparatus controlling method according to claim 1, wherein upon a resetting performed in the bus line, the first apparatus disables the preset and maintains the stored identification data for at least a predetermined period following the resetting, during the predetermined period, the first apparatus identifies the second apparatus connected to the bus line from the stored identification data, performs the presetting of the settings for inputting or outputting of the data only in response to the command from the identified second apparatus, and after the predetermined period has been passed, the first apparatus removes the disablement of accepting the preset requesting command from the other apparatuses.

4. The apparatus controlling method according to claim 1, wherein the first apparatus cancels the preset in response to a direction for canceling the preset issued by the apparatus which is the issuer of the preset command for the above particular preset, if this particular preset is enabled in the first apparatus.

5. The apparatus controlling method according to claim 1, wherein the first apparatus transmits data for identification of the second apparatus to an issuer of another of the command requesting the presetting of settings in the first apparatus for data transmission with one of the apparatuses other than the second apparatus, if the preset for the second apparatus is enabled in the first apparatus.

6. A transmission device for controlling an audio/video stream data transmission with other apparatuses connected via a predetermined bus line, comprising:

an inputting portion for input of data transmitted via the bus line, a data processing portion for finding from the data inputted by the inputting portion a command regarding a presetting of settings for input selection or output selection of the audio/video stream data transmission with a specific one of the apparatuses connected to the bus line, and for performing the presetting specified in the command, and a storing portion for storage of identification data unique to the specific one of the apparatuses contained in the command detected by the data processing portion, wherein when the data processing portion presets the audio/video stream data transmission with the specific one of the apparatuses and another apparatus sends another command to the transmission device, the transmission device rejects the other command, and the other apparatus sends a status command to the specific one of the apparatuses requesting identification information relating to the specific one of the apparatuses for reporting an error message.

7. The transmission device according to claim 6, wherein the data processing portion disables the preset, identifies the specific one of the apparatuses from the identification data stored in the storing portion once a resetting is performed in the bus line, and wherein the data processing portion does not perform any presetting requested by the command transmitted from any other of the apparatuses then the identified specific one of the apparatuses.

8. The transmission device according to claim 6, wherein the data processing portion disables the preset, and identifies the specific one of the apparatuses from the identification data stored in the storing portion once a resetting is performed in the bus line, wherein the data processing portion performs the presetting of the settings for inputting or outputting of the data only in response to the command from the above identified specific apparatus for at least a predetermined period, and after the predetermined period having been passed, performs the presetting in response to the command from any of the apparatuses including the specific one of the apparatuses.

9. The transmission device according to claim 6, wherein the data processing portion cancels the preset in response to a command for canceling the preset issued from the apparatus which is the issuer of the command regarding a presetting of settings.

10. The transmission device according to claim 6, wherein the data processing portion detects a command regarding a preset from another apparatus when the preset is enabled, and the data processing portion transmits data regarding an apparatus identified from the identification data stored in the storing section to an issuer of the command regarding a presetting of settings.

* * * * *